United States Patent
Stones et al.

(10) Patent No.: US 8,065,805 B2
(45) Date of Patent: *Nov. 29, 2011

(54) VEGETATION PRUNING DEVICE

(75) Inventors: Kevin Stones, Bishop Auckland (GB); David Barker, Prudhoe (GB); David Jarman, Green-Haworth Accrington (GB)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,466

(22) Filed: Aug. 14, 2008
(Under 37 CFR 1.47)

(65) Prior Publication Data
US 2008/0295342 A1    Dec. 4, 2008

Related U.S. Application Data

(62) Division of application No. 10/890,479, filed on Jul. 13, 2004, now abandoned.

(30) Foreign Application Priority Data

Jul. 14, 2003  (GB) .................................. 0316447.2

(51) Int. Cl.
*A01G 3/08* (2006.01)
*B26B 17/02* (2006.01)
*B27G 19/06* (2006.01)

(52) U.S. Cl. ................ 30/378; 30/124; 30/289; 30/312; 30/381; 30/382

(58) Field of Classification Search .................... 30/124, 30/289, 312, 380–391, 378, 123.4, 274, 286, 30/293, 295, 340, 370, 371, 512
See application file for complete search history.

(56) References Cited

U.S. PATENT DOCUMENTS

| 476,459 | A | * | 6/1892 | Hamann et al. ................. 30/252 |
| 508,022 | A | * | 11/1893 | Kamphaus ...................... 30/250 |
| 1,583,613 | A | * | 5/1926 | Smith .............................. 83/745 |
| 2,150,268 | A | * | 3/1939 | Denton ........................... 30/378 |
| 3,059,673 | A | * | 10/1962 | Woleslagle ...................... 30/161 |
| 3,182,695 | A | * | 5/1965 | Rigoni ............................. 30/382 |
| 3,384,136 | A | * | 5/1968 | Marin et al. .................... 30/382 |
| 3,805,383 | A | * | 4/1974 | McNally ........................... 30/92 |
| 3,834,019 | A | * | 9/1974 | Smeltzer et al. ................. 30/92 |
| 3,991,470 | A |   | 11/1976 | Cartmill |
| 4,060,894 | A | * | 12/1977 | Hampton ........................ 30/382 |
| 4,294,012 | A |   | 10/1981 | Lanz |
| 4,945,641 | A |   | 8/1990 | Miller et al. |

(Continued)

FOREIGN PATENT DOCUMENTS

DE         28 13 380        10/1979
(Continued)

*Primary Examiner* — Clark F. Dexter
(74) *Attorney, Agent, or Firm* — John Yu

(57) ABSTRACT

A vegetation pruning device (102) includes a pair (114, 116) of pivotably coupled handles and a motor having a rotary output drive (130) for driving an endless flexible cutting chain (108). A guard (162) is moved relative to the chain (108) by pivoting the handles (114, 116) relative to each other to grip vegetation between the guard (162) and the chain (108). The guard is provided with a pair of curved upper surfaces (164) having teeth (166). The rotary output drive (130) of the motor is arranged generally coaxially with the axis of pivotal movement of the handles (114, 116).

3 Claims, 14 Drawing Sheets

U.S. PATENT DOCUMENTS

| | | | | |
|---|---|---|---|---|
| 4,991,297 | A * | 2/1991 | Cain | 30/382 |
| 5,237,752 | A | 8/1993 | Maseck | |
| 5,570,510 | A * | 11/1996 | Linden | 30/250 |
| 5,689,888 | A * | 11/1997 | Linden | 30/250 |
| 6,578,267 | B2 * | 6/2003 | Seyfer | 30/93 |
| 7,140,114 | B2 * | 11/2006 | Shenker et al. | 30/382 |
| 2003/0014868 | A1 * | 1/2003 | Cech et al. | 30/296.1 |
| 2004/0250431 | A1 * | 12/2004 | Shenker et al. | 30/382 |

FOREIGN PATENT DOCUMENTS

| | | |
|---|---|---|
| FR | 2 534 449 | 4/1984 |
| FR | 2 554 757 * | 5/1985 |
| FR | 2 705 271 * | 11/1994 |
| GB | 721631 | 1/1955 |

* cited by examiner

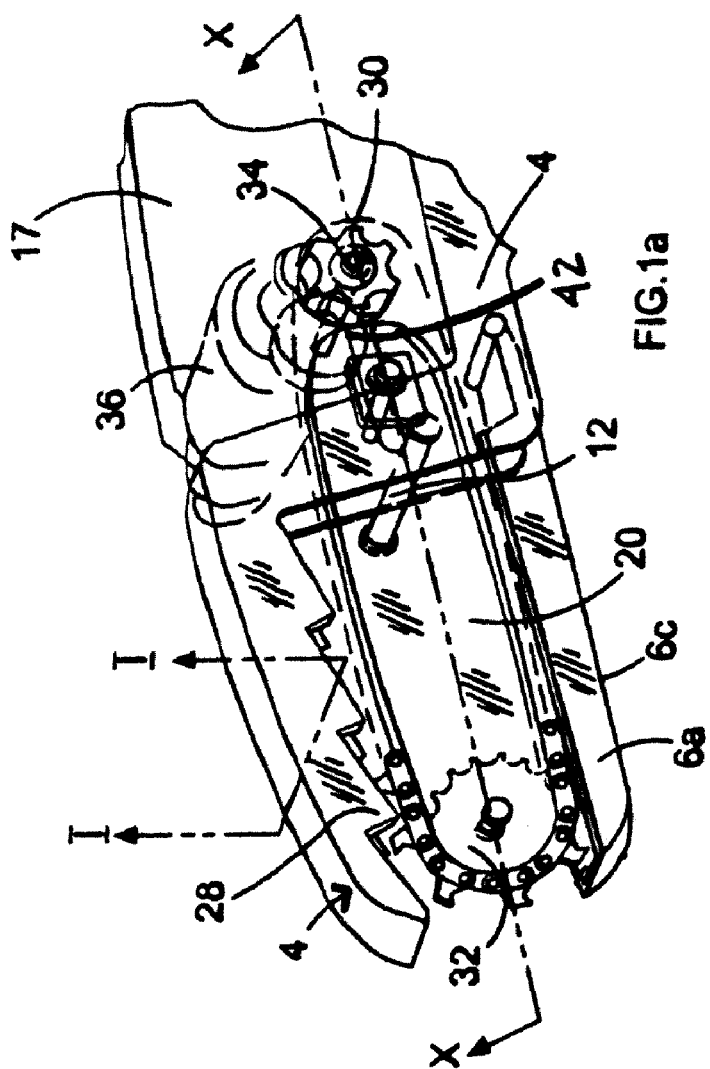
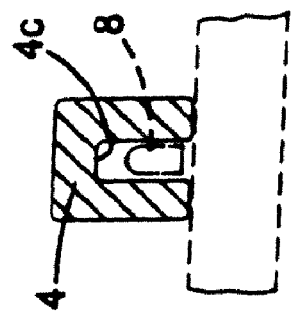
FIG.1a
FIG.1b

VEGETATION PRUNING DEVICE

FIELD OF THE INVENTION

The present invention relates to a vegetation pruning device and has particular, although not exclusive, relevance to such a device as would be used for gardening purposes.

BACKGROUND OF THE INVENTION

There are a considerable array of tools available for the modern gardener in order to be able to keep growth of vegetation under control. The term "gardener" is meant not only to encompass small domestic concerns, but also larger more agricultural endeavours. Whatever the nature of the gardening, however, there will be a need to control the rate of growth of vegetation for either aesthetic or other purposes such as crop yields etc.

Among the many tools available for keeping vegetation growth under control are, for example, shears for pruning or cutting "light" vegetation such as grass or leaves or small twigs etc. Shears operate by pivoting a pair of blades located in parallel planes relative to each other so that shear forces are applied to vegetation placed in the angle between the blades, the cutting force being generated by manual force of the user, applied to handles attached to the blades. The size or thickness of vegetation which can be cut by shears is limited to the amount of manual force which can reasonably be applied to the handles by the average user. Known shears also suffer from the disadvantage that the act of pivoting the arms of the shears relative to each other to effect cutting tends to push vegetation being cut away from the gap between the blades of the shears, which makes the it more difficult to effect cutting of the vegetation.

At the other end of the scale there are hedge trimmers and the so-called chain saw used for "heavy" vegetation cutting such as trees (whether smaller branches or the entire tree).

Additionally there are smaller-scale tools such as secateurs or scissors used for more delicate pruning or cutting operations.

In any event it will be appreciated that the modern gardener will more usually choose a tool specific to the particular type of pruning operation required. For example, and with reference to the above, when light pruning is necessary of, for example, domestic flowers, then the secateurs are likely to be chosen. Alternatively if bushes are to be pruned, or grass is to be cut, then shears will often be chosen.

There exists, however, a gap in the tool array when moving from "light" bushes to "heavy" trees. Very often vegetation will be of such a size and nature (such as larger bushes or small trees) which are either of a density or branch diameter too large for shears or hedge trimmers to cope with but for which use of the chain saw is unnecessarily excessive.

It is, therefore, an object of the present invention to provide a vegetation pruning device which at least alleviates the above shortcomings by providing a novel form of tool which fits nicely in this gap. Provision of such a tool provides a compact and safe arrangement whereby pruning of the "heavier" vegetation is possible without the need to resort to the aggressive and particularly dangerous tool such as a chain saw.

A known type of chain saw is disclosed in U.S. Pat. No. 4,294,012 and has a guard pivotable relative to a blade of the chain saw and located in a plane parallel to the plane of the chain saw blade, to enable the guard to either be inserted beneath a log to be sawn, to reduce the tendency of the sawn piece of log to pinch the chain saw blade, or to grasp small branches to be sawn and force them into the chain saw. The chain saw has a first handle arranged on the chain saw body, and a second handle connected to the guard, so that the guard can be pivoted relative to the chain saw blade by pivoting the handles relative to each other.

However, this arrangement suffers from the drawback that the motor which drives the cutting chain is generally the heaviest component of the saw, and is arranged some distance from the axis about which the first and second handles pivot relative to each other. This in turn makes the chain saw more difficult to operate, since significant forces need to be applied to the handles to pivot them relative to each other.

Preferred embodiments of the present invention seek to overcome the above disadvantages of the prior art.

SUMMARY OF THE INVENTION

According to the present invention, there is provided a vegetation pruning device comprising:

a pair of arms adapted to pivot relative to each other about a first axis to adjust the angle between said arms, wherein each said arm has at least one respective handle portion adapted to be gripped by a user;

a motor having a rotary output drive rotatable about a second axis;

an endless flexible cutting element mounted to a support and adapted to be driven relative to said support by means of said rotary output drive to cut vegetation presented thereto; and at least one gripping or guard member adapted to be moved relative to said cutting element by means of pivoting of said arms relative to each other to grip vegetation between said gripping member and said cutting element;

wherein said rotary output drive is arranged adjacent said first axis.

By providing a rotary output drive is arranged adjacent the first axis, this provides the advantage of maximising the mechanical advantage of the device by minimising the forces which need to be applied to the arms to pivot the arms relative to each other, which in turn makes the device easier to use.

The first axis may be substantially parallel to the second axis.

The motor may have a centre of mass arranged adjacent the first axis.

At least one said gripping member may be provided with at least one protrusion for resisting rotation of vegetation gripped between said gripping member and said cutting element relative to said gripping member.

This provides the advantage of further assisting the cutting operation.

At least one said gripping member may have at least one respective curved edge facing towards said cutting element.

At least one said protrusion may be defined by a respective notch in a said curved edge.

At least one said gripping member may be pivotably mounted relative to one of said arms.

The motor may be mounted to a first said arm.

The pruning device may further comprise at least one power supply for powering said motor, wherein at least one said power supply is mounted to said first arm on a side therefore opposite to said motor.

By mounting at least one power supply on said first arm on a side thereof opposite to said motor, this provides the advantage of distributing the weight of the pruning device as evenly as possible.

Preferably, the arms are pivotable between a first position allowing access to said cutting element, and a second position in which the cutting element is substantially inaccessible.

This feature enhances the safety of the device when the shear arrangement is in its closed position. It prevents the user accidentally putting their fingers or hands in contact with the cutting element—something which is desirable to avoid.

The pruning device may further comprise first biasing means for biasing said arms towards said second position.

The pruning device may comprise a first gripping or guard member provided on a first said arm and a second gripping or guard member provided on a second said arm.

The second guard member may be moveable between a first position allowing access to said cutting element and a second position preventing access to said cutting element.

This enables access to the cutting element, for example to replace it when it becomes worn.

The pruning device may further comprise second biasing means for biasing said second guard member towards said second position.

The second guard member may be moveable to said first position only when said arms are in said second position.

The first and/or said second guard member may be resiliently biased towards the cutting element and movable away therefrom under application of force.

This again is a safety feature which obviates the need for the user from contacting the cutting element or vegetation in the region of the cutting element but still permits the cutting element, having but the vegetation, to pass therethrough.

The first and/or second guard member may comprise first vegetation restraining means having a series of indentations and or projections disposed towards said cutting element to provide points of restraint or retention of said vegetation thereagainst.

This allows for the vegetation to be cut to be held in abutment with the cutting element by use of the shears themselves and thus reducing the potential for injury of a user's hand or fingers coming into contact with the cutting element. Since the cutting element is powered there will often be associated therewith considerable movement of the cutting element which will otherwise tend to dislodge and move the vegetation being cut and thus it is desirable to restrain such motion against the cutting force applied by the cutting element.

The first and/or second guard member may be associated with said cutting element so as to be displaceable away from said cutting element by said vegetation through which said cutting element has cut.

The first and second guard members may be adapted to engage each other at least adjacent respective ends thereof remote from said axis when said arms are in said second position.

The pruning device may further comprise first locking means for releasably locking said arms in said second position.

A second said arm may comprise second vegetation restraining means for restraining vegetation inserted between said pair of arms from displacement when engaged with said cutting element.

The second vegetation restraining means may comprise a series of indentations and or projections disposed towards said cutting element to provide points of restraint or retention of said vegetation thereagainst.

The series of projections may comprise a plurality of teeth inclined and facing towards said cutting element.

The second arm may comprise a substantially parallel pair of side walls defining a channel therebetween for at least partially receiving said cutting element as the cutting element is pivotally displaced towards said second arm.

The pruning device may further comprise at least one stop member to limit pivotal displacement of said arms towards one another for restraining said cutting element at a predetermined pivotal position relative to said second arm so as to remain received within said channel.

This specifically allows the other of said arm to restrain the vegetation as it brought into engagement with the cutting element but since such vegetation being cut will lay transversely across these two arm members then as the cutting element passes into the channel it will effect complete cutting of any vegetation supported on theses pair of sidewalls.

The channel may comprise an inner surface extending between said substantially parallel side walls defining a dust/debris conveying path communicating with a dust/debris extraction aperture.

The substantially parallel pair of side walls may be profiled to allow at least part of said cutting element to pass completely through said channel as said cutting element is pivotally displaced towards said other of said pair of arms.

The side walls may have a V-shaped profile for receiving and supporting in an inner apex thereof vegetation to be cut.

The specific use of a V-shaped profile permits accurate holding of vegetation of different diameters at a predetermined, usually central, position relative to the cutting element.

The motor rotary output drive may include a toothed drive wheel.

The motor may have an output gear adapted to rotate about an axis substantially parallel or substantially perpendicular to the axis of rotation of said rotary output drive.

The cutting element may be mounted upon a support member and arranged for rotation thereabout under the influence of the rotary output drive.

The support member may include a driven and a drive wheel around which the cutting element moves as the drive wheel rotates.

The cutting element may rotate within a first plane and the arms of the pair of arms each include a surface which extends either side of this first plane.

The cutting element may comprise a chain.

The teeth of the toothed wheel may fit between the links of the chain in use to provide motive force to the chain.

The chain may further include a plurality of barbs to assist in vegetation pruning.

The pruning device may further comprise an actuator for controlling operation of the motor.

The actuator may be a variable speed-controller for governing the output speed of the motor.

The actuator may comprise at least one resiliently biased switch member mounted on each of the two arm members, wherein said actuator is restrained from operating said motor unless at least one said switch member on each arm is operated.

This ensures that the pruning device can only be operated when the user is grasping both arm members and thus using the tool correctly. In the event that the user has an accident resulting in loss of grip on one or other of the arm members the at least one switch member mounted thereon will no longer be operated causing the motor to be stopped and thus presenting an additional safety feature. Such resiliently biased switch member may provide either mechanical or electrical restraint of the actuator when in a non-operated position.

The pruning device may comprise a self adjusting tensioning device to allow automatic adjustment of the support member.

Adjustment of said support member may effect tensioning of said cutting element.

The self adjusting tensioning device may comprise adjustable restraint means for releasably securing said support member relative to said pruning device together with a rigid support block rigidly secured to one of said pair of pivotally coupled arms on which said support member is mounted, said block having a resiliently biased adjustment member disposed between said support block and said support member to exert a displacement force on said support member away from said support block when said restraint member is in a released position.

The biasing member may comprise a spring biased plunger having a first ratchet member and said support block having a second ratchet member whereby engagement between said first and second ratchet members prevents displacement of said plunger towards said support block.

The pruning device may further comprise a lubricating device for depositing lubricating material on said cutting element.

The lubricating device may include a reservoir for lubricating material located within a second said arm.

The lubricating device may be adapted to deposit a predetermined amount of lubricating material on said cutting element in response to opening of said arms relative to each other and/or opening and closing of said arms relative to each other.

The motor may be an electric motor adapted to be switched so as to effect braking of said cutting element.

Several preferred embodiments of the present invention will now be described, by way of example only, and with reference to the accompanying drawings of which:

BRIEF DESCRIPTION OF THE DRAWINGS

FIG. 1a is a schematic inverted view of the jaws of the embodiment of FIG. 1 showing in ghosting the internal working mechanism thereof;

FIG. 1b is a cross sectional view of one of the jaws of the embodiment of FIG. 1a along the lines I-I;

DETAILED DESCRIPTION OF THE INVENTION

Figure 1:
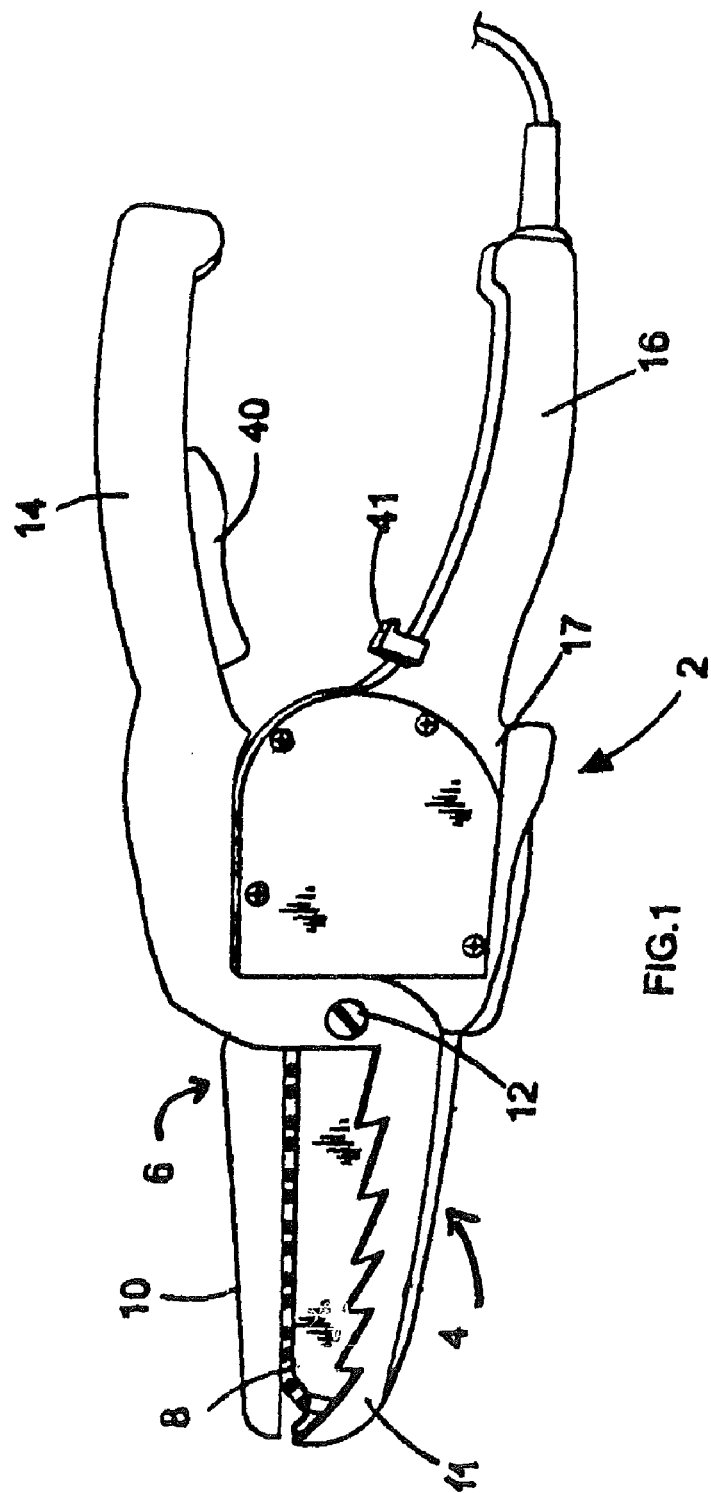
FIG. 1 shows a side view of an embodiment of the invention with the jaws of a pair of jaws in the "closed" position.

Referring particularly to FIG. 1 of the drawings, a vegetation pruning device shown generally as 2 is shown. In the example shown in FIG. 1, it can be seen that the pruning device comprises a pair of pivotally coupled arms 4 and 6. In this example the upper arm 6 of the pair of arms 4, 6 comprises a composite structure formed from a cutting element 8, an outer or guard portion 10 biased towards the cutting element 8, and a handle portion 16. The lower arm 4 is comprised of a guard portion 11 and a corresponding handle 14. A pivot point 12, in this embodiment an appropriate through bolt, articulates the first lower arm 4 of the pair of arms to the second upper arm 6 of the pair of arms so that the arms 4, 6 can be "open" and "closed" by appropriate relative movement of respective handles 14 and 16 of the arms. The handles 14, 16 are arranged in a plane generally perpendicular to the axis passing through pivot point 12 about which arms 4, 6 pivot relative to each other.

Figure 2:
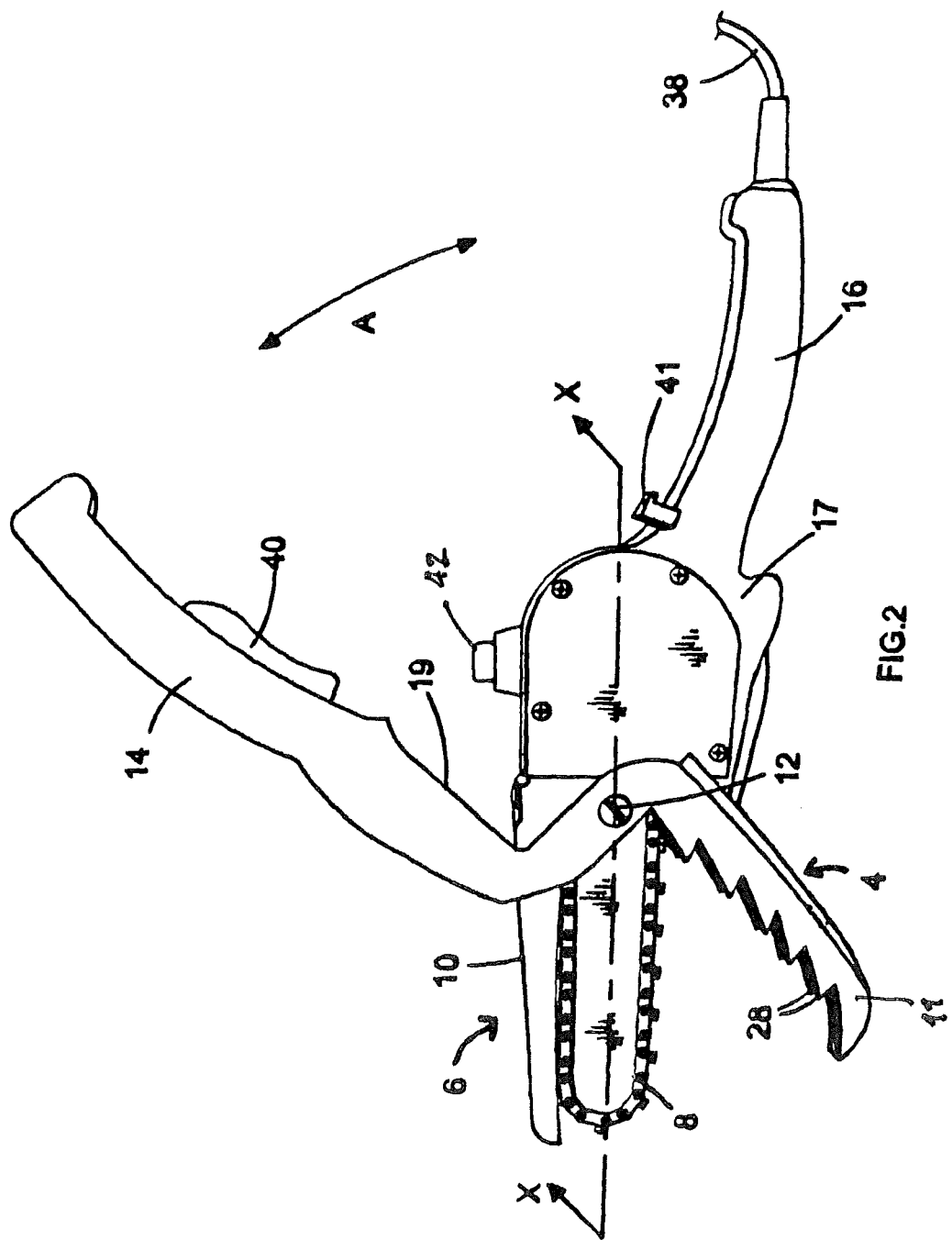
FIG. 2 shows the side view of FIG. 1 but with the jaws of the pair of jaws in the "open" position.
Figure 6:
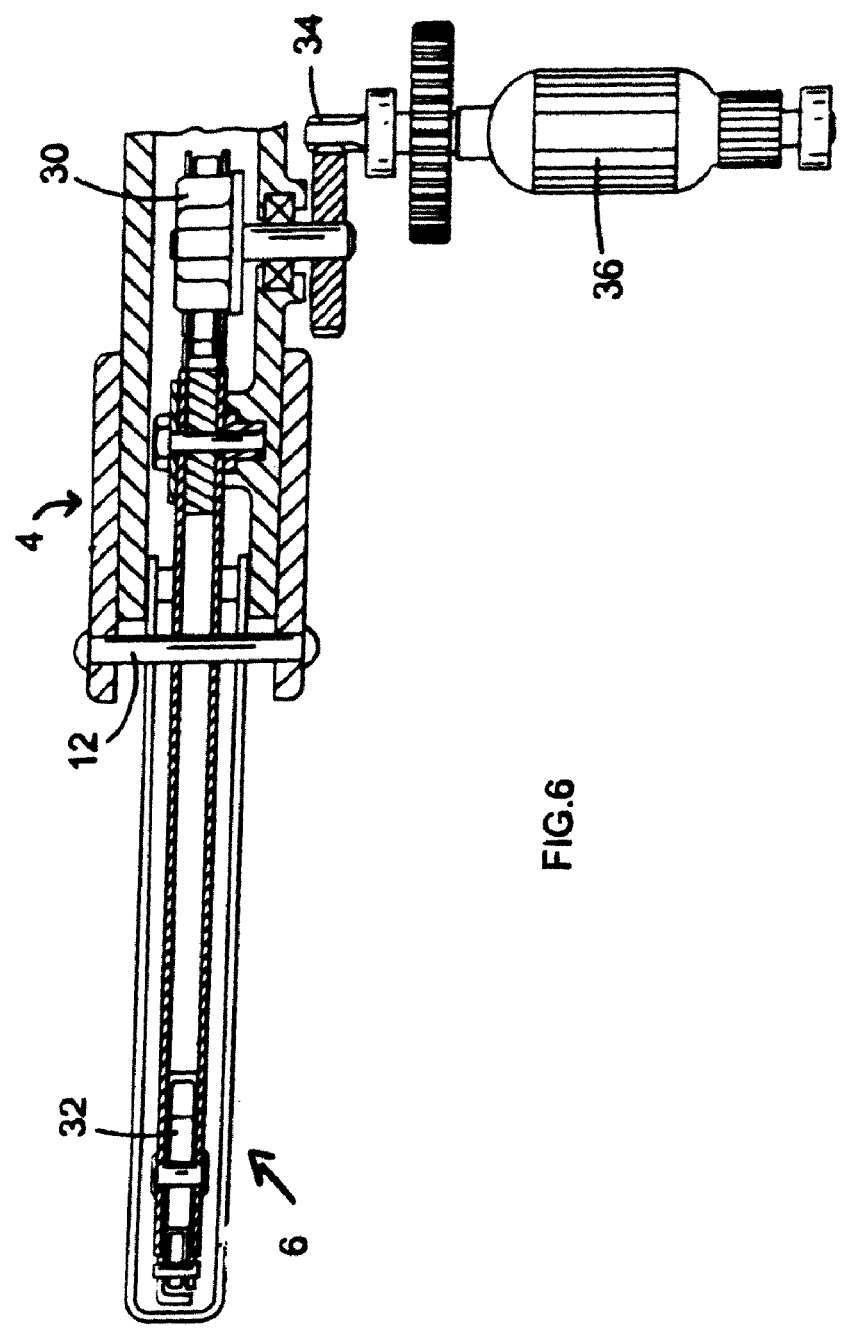
FIG. 6 illustrates schematically the internal mechanism of the apparatus of FIG. 2 taken along the sectional line X-X.

Referring now particularly to FIG. 2 it can be seen that a user may move the handles 14, 16 apart from one another (as indicated by arrow A) such that the arms 4, 6 also move apart from one another to the "open" position via the pivot point 12. It can be seen from this figure that opening the arms 4, 6 exposes the cutting element 8 such that vegetation for pruning may be introduced into the space between the arm 4 and cutting element 8. The corollary to this, of course, is that in FIG. 1, where the arms 4, 6 are shown in the "closed" position, the cutting element 8 is generally shielded such that it is substantially inaccessible. This will become more understandable from the description below and particularly with reference to FIG. 6.

Figure 3:
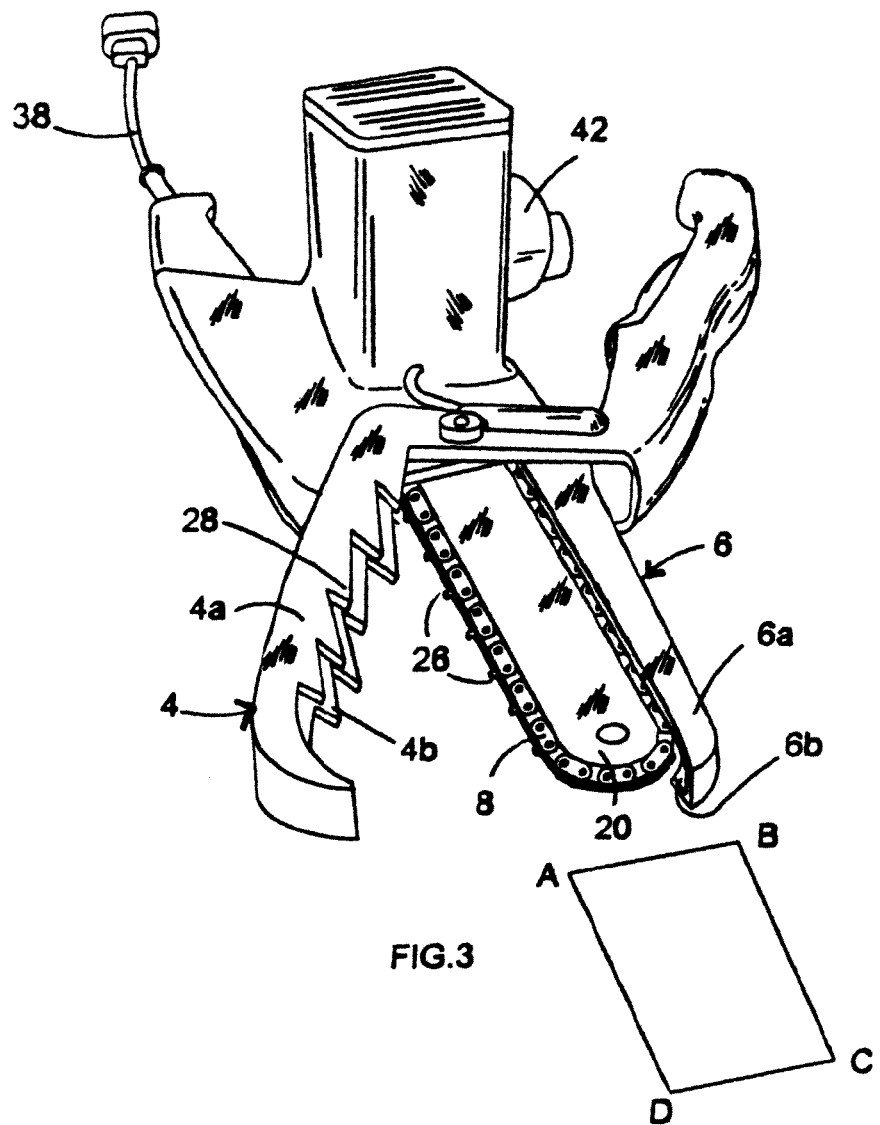
FIG. 3 is a front perspective view of the embodiment of FIG. 1 with the jaws in an open position.
Figure 7:
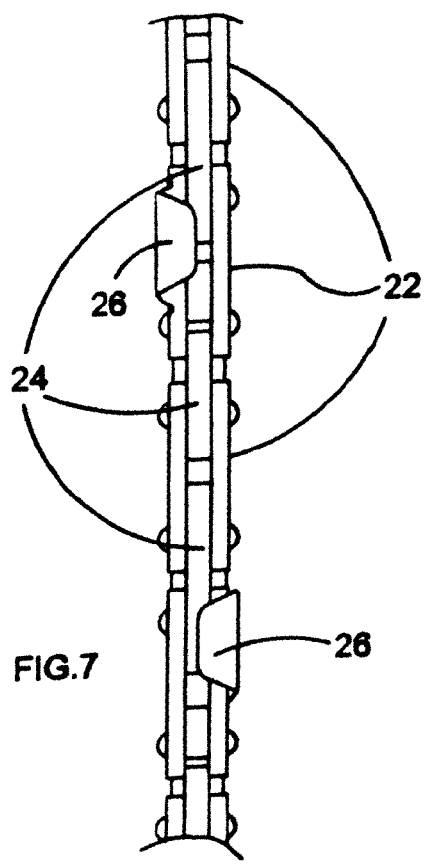
FIG. 7 shows a sectional view through part of the chain cutting element.

Referring now particularly to FIG. 3 it can be seen that the cutting element 8, in this example a linked chain, passes over a support member, in this example a longitudinally extending chain bar 20. A longitudinal section taken through the chain 8 is shown in FIG. 7. It can be seen here that the chain 8 comprises a plurality of links 22 which serve to interconnect sets of pairs of chain elements 24. The construction of the linked chain 8, in this manner, therefore, is conventional. Such a style of chain is used, for example, in chain saws for cutting trees and also on bicycles and motorbikes for providing motive force. Also shown in FIG. 3, although not essential to the operation of the invention, are a plurality of barbs 26 coupled to the chain 8 used to assist in the cutting operation of the chain 8. It will be apparent to those skilled in the art that a conventional chain saw uses a linked chain with such barbs attached thereto. The purpose of the barbs 26 is to provide the cutting or slicing action of the chain in the vegetation to which it is presented. This chain 8 and chain bar 20 are similar to those employed in a conventional chain saw but, for the purpose of understanding the present invention, simply represent a powered cutting element.

It can also be seen from FIG. 3 that the chain 8, which is mounted upon and surrounds the chain bar 20, extends within a plane shown as ABCD in the drawing. It can be seen from FIG. 3 and also FIG. 6 that the guard portions 11 and 10 of the arms 4 and 6 include side cover portions or plates—respectively 4a, 6a and 4b, 6b—which serve, when the arms 4, 6 are in the "closed" position (in FIG. 1), to at least partially encapsulate or surround the chain 8. With reference to FIG. 1a it is seen that the guard portion 10 of the arm 6 comprises two substantially parallel side plate members (6a and 6b) having a space therebetween slightly greater than the maximum width of the chain 8 and chain bar 20. The outermost edges 6c of each of the plates 6a and 6b are interconnected by a substantially perpendicular outer plate member such that this arm portion 6, in cross section, presents a substantially U-shaped profile into which the chain (or powered cutting element) may be at least partially accommodated. The front end of this arm 6 is further curved so as to partially enclose the front end of the curved end of the cutting element as shown in FIG. 1a. It is also possible for the arms 4, 6 to abut each other at their front ends in the closed position to completely restrict access to the front end of the cutting element 8. This significantly improves the safety of the apparatus, since accidents can result from inadvertent contact between the front end of the cutting element 8 with a workpiece or the ground, causing loss of control over the apparatus, or the flex supplying electric power to motor 36 can be inadvertently cut by passing into the gap between the arms 4, 6.

Alternatively, or in addition, a so-called nose guard (not shown) can be provided which restricts access to the front end of the cutting element 8. This can abut or enclose the front ends of arms 4, 6 when in their closed position to also prevent opening of the arms 4, 6 relative to each other.

With regard to FIGS. 1a and 1b the proposed guard portion 11 is again provided with a substantially U-shaped cross sectional profile (FIG. 1b) into which at least part of the chain 8 may be accommodated (as indicated in hashed lines in FIG. 1b). Thus in the enclosed configuration, the arm members 4 and 6 serve to at least partially encompass the powered cutting element (chain 8). Both arms 4 and 6 are provided with curved front end portions to also partially enclose the front curved end of the cutting element.

It can be seen from FIG. 1, therefore, that when the arms 4, 6 are in a closed position direct access to the chain 8 (and, in particular the barbs 26 attached thereto) is not possible. This provides a significant safety feature for the user of the vegetation pruning device 2 in accordance with the present invention. By providing that each of the guard portions 4a, 4b and 6a, 6b of their respective arms 4, 6 extend in a direction parallel with the plane ABCD, yet each of these extensions are arranged to be laterally offset both from the plane in which the chain 8 rotates and physically from the chain 8 itself, then access to the chain 8 by user from a direction perpendicular to this plane ABCD is not possible when the arms 4, 6 are in a closed position. The handles 14 and 16 are designed so that when brought into the closed configuration as shown in FIG. 1 the handles will engage one another to define a limited end stop to the pivoted closed position (FIG. 1). In this embodiment, the handle 16 is provided with a motor housing 17 (to be described below) against which an inner portion 19 of the upper handle 14 (the term inner used to indicate proximate pivot axis 12) which engages to define this end stop position (FIG. 1). This defined end stop position causes the side guard portions 4a and 4b of the arm 4 to partially enclose the blade but retain the arm portion 4 in a position whereby its inner face 4c (FIG. 1b) is restrained from engaging with the blade 8 as shown. Thus, the arm member 4 whilst able to partially enclose the cutting element is restrained from engagement therewith when in an enclosed configuration. Similarly, and as will be described in more detail below, the upper arm 6 is pivotally biased to the position substantially shown in FIGS. 1, 1a and 2 so that it will partially enclose the cutting element or chain 8 but has a stop position as shown which prevents it from being displaced into engagement with such cutting element, again allowing the cutting element to be partially enclosed thereby but is restrained from interference with such cutting element operation.

It can be seen from the figures that, in this embodiment, the guard portion 11 of the arm 4 has a plurality of indentations or projections thereon, in this example projecting teeth 28, which are employed in use of the pruning device, to restrain vegetation being cut by the chain 8 in a largely immovable position relative to the arms 4, 6 and the cutting element 8. It will be apparent that in order to effect efficient pruning of vegetation, the vegetation to be pruned needs to be held steady relative to the cutting element so that an accurate cut can be obtained. The purpose of the teeth 28, therefore, is to achieve such function. If desired, the teeth 28 could also be formed on the guard portion 10 of the arm 6 in addition or alternatively to that of the guard portion 11. Also any suitable shape or profile of such indentations or projections which achieve the holding of the vegetation steady relative to the cutting element are equally efficacious. As seen in FIGS. 1 and 2 the direction of rotation of the chain 8 is indicated by the arrows on the chain bar 20. The specific use of the saw teeth 28 is such that rotation of chain 8 will cause it to engage with any workpiece placed between it and the guard portion 11 whereby the cutting action will attempt to displace the branch or workpiece in a direction towards the pivot axis 12 which will, in practice, some to drive such workpiece or branch into positive engagement with the teeth 28 therefore enhancing the gripping effect resultant from use of such teeth 28. If teeth are employed on the guard portion 10 then it is preferred such saw teeth will be inclined in an opposite direction to that of guard portion 11 so as to again cause any workpiece being cut to be forced into positive retaining engagement therewith in a similar manner to employment of the teeth 28.

In order to provide a motive drive force to the chain 8 the proximal end (that is the one remote from the plane ABCD in FIG. 3) of the chain bar 20 includes a drive wheel or sprocket 30 (shown in FIG. 1a and FIG. 6 but not visible in the other figures) which engages and drives the chain 8 in a conventional manner.

Also, it will be apparent, that the distal end of the chain bar 20 includes a driven wheel or sprocket 32 (again, shown in FIG. 1a and FIG. 6 but not visible in the other figures) to allow rotation of the chain 8 around the chain bar 20. The chain 8, when driven by the drive sprocket 30, therefore, rotates in a continuous loop about the external periphery of the chain bar 20. It can be seen from FIG. 6 that the drive sprocket 30 is coupled to an output shaft 34 of an electric motor 36. In the example shown the motor 36 provides a direct rotary output for the output shaft 34, although those skilled in the art will appreciate that, dependent upon the conditions of use of the pruning device, a gearbox (not shown) between the motor 36 and the drive sprocket 30 may be useful in order to adjust the amount of torque and/or the rotational speed exhibited by the chain 8 as it is being driven. In this manner, the cutting element operates as a conventional cutting element of a chain saw.

Power for the motor 36 is provided in conventional manner by power supply cable 38 which will be coupled to a source of mains power or the like (alternatively, albeit not shown, power could be supplied by a battery or petrol engine). In one particularly advantageous implementation of the invention, the motor 36 is powered by a rechargeable battery (not shown), which is arranged on the housing of the apparatus on the opposite side to the motor 36. This allows a particularly ergonomic arrangement in which the weight of the rechargeable battery balances that of the motor 36 no that the centre of gravity of the apparatus is as near as possible to the central plane of the apparatus. Operation of the motor 36 is dependent upon actuation of a trigger switch 40 by the user of the device 2. The trigger switch 40 is conveniently mounted upon one of the handles, in this example, handle 14. By mounting the trigger 40 on the handle it is easy for the user of the device not only to hold and operate the device, but then also to have a readily available means of activating or deactivating the motor 36. Additionally, it is entirely feasible (although optional) for there to be a secondary operating device mounted upon the other handle 16. This would operate as a "failsafe" mechanism whereby unless both actuators were depressed or activated by the user then the device would be inoperable. This is useful in situations such as those where the user would be in an elevated position up a ladder, or the like, and possibly reaching in order to cut vegetation. It is known that these situations are potentially dangerous and an ensuring that the user must have both hands on the pruning device 2 in order to operate it is desirable. An example of such a secondary failsafe mechanism is illustrated by a secondary displaceable switch element 41 which again is readily accessible via a users fingers when gripping the handle 16. The use of dual switching mechanisms are conventional within many forms of power tools and their specific operation need not be described in any great detail here. However, their operation may be electrical or a combination of electrical mechanical mechanisms. For example operation of the motor will be prevented unless both switch elements 40 and 41 are displaced from an unactuated to an actuated position. In this manner the failsafe mechanism may simply comprise an electrical connection to the motor requiring a dual electrical input or may in fact provide some form of mechanical stop mechanism preventing electrical connection between the switch element member 41 and the motor 36. A particular advantage in this invention will be determined that should the users grip on either handle be released then operation of the motor is immediately stopped.

The trigger switch 40 in this embodiment not only controls actuation of the motor 36 but, dependent upon the amount of pressure applied thereto by user, dictates the speed of output of the motor 36. Such switches are readily available in the art.

The safety of the pruning device can be further enhanced by having a braking arrangement for bringing the chain 8 to a halt as quickly as possible when power to the motor 36 is interrupted. One way of achieving this is to arrange for the motor 36 to be short circuited when the switch 40 is released, so that the motor 36 acts as an electromagnetic brake.

It will be appreciated from the above that the teeth of both the drive sprocket 30 and the driven sprocket 32 operate to engage the chain 8 in a conventional manner. Clearly the frictional contact which occurs by virtue of this engagement and also the wear of the chain 8 around the periphery of the chain bar 20 may cause a significant amount of heat to be generated. It is therefore advisable for not only some lubrication to be applied to the entire cutting element mechanism including its drive means, but also a mechanism provided for varying the tension felt by the chain 8 if it wears during use.

In order to provide lubrication for the chain 8 and its drive mechanism 30, 32, 34 therefore, there is provided an oil reservoir 42 mounted adjacent the drive sprocket 30 and able to dribble lubricating oil onto the drive sprocket 30 during use of the motor 36. The lubrication mechanism can have a lubrication reservoir (not shown) arranged inside the lighter handle 14, as a result of which the apparatus is of compact construction, and the weight of the apparatus is balanced as evenly as possible. The lubricating mechanism can be arranged to dispense a fixed amount of lubricant in response to opening of the handles 14, 16 relative to each other, or in response to opening and then closing of the handles 14, 16 relative to each other. It is also possible for the lubricating mechanism to take higher levels of heating of the chain 8 into account by controlling the amount of lubricant dispensed in dependence upon the speed at which motor 36 is driven, so that more lubricant is dispensed at higher operating speeds of the motor 36.

The chain tensioning mechanism employed in this specific embodiment is again one conventionally employed in the art of chain saws. The chain bar 20 (as is shown in FIG. 1*a*) is securely mounted to the arm member 6 in the region of the motor housing 17 by an appropriate threaded bolt member (not shown). Such a threaded bolt member will have a first engaging face against which one side of the chain bar 20 is received and a second threaded nut member is then rotatably received on such bolt so as to compress the chain bar 20 therebetween. Operation of this nut or bolt can be achieved in a number of conventional manners but will usually employ an external sprocket member which can be manually rotated as appropriate. In the event that use of the cutting element causes a loosening of the chain (such as by stretching of the distance between adjacent link elements), the chain bar 20 may then slideably displaced about this bolt member in a direction away from the pivot axis (12) of the pruning device by firstly loosening the nut member of the nut and bolt restraining mechanism and manually displacing the blade in a direction away from such pivot axis 12 effectively increasing the distance between the sprocket 32 and the sprocket 30 causing the tightening of the chain thereabout. Once appropriate tightening has been achieved the chain bar 20 is fixed into the new position by appropriate retightening of the nut and bolt member. This chain tension device is conventional for chain saws.

Figure 4:
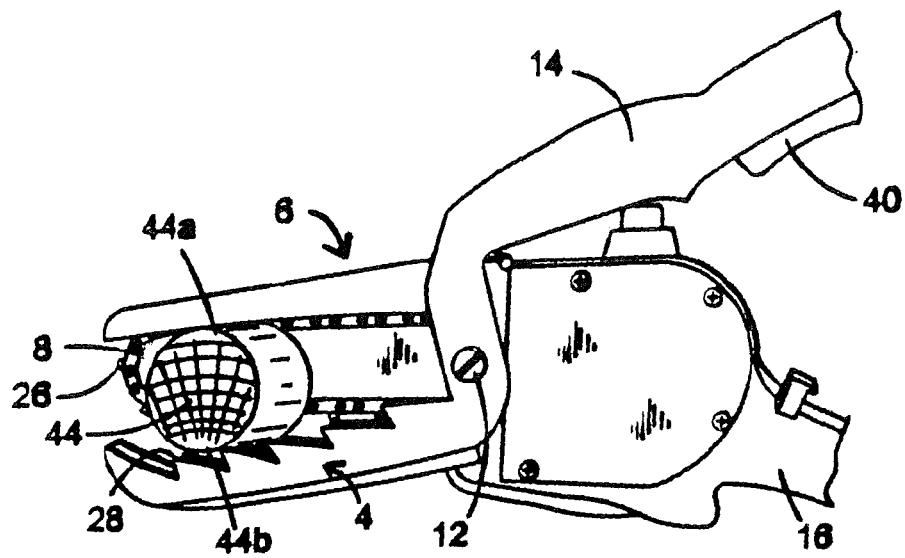
FIG. 4 shows a side view of the embodiment of FIG. 1 with a representative vegetation sample having been partially cut.
Figure 5:
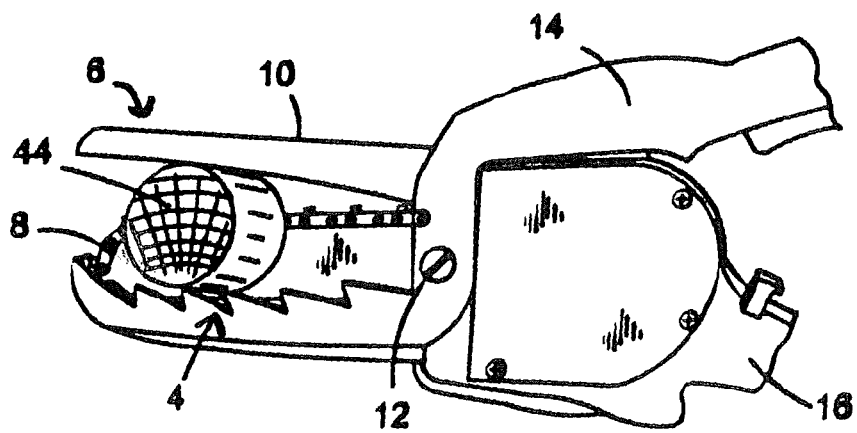
FIG. 5 shows the continued cutting of the vegetation from FIG. 4 but at a more advanced stage.

Referring now to FIGS. 4 and 5, in that order, operation of the device 2 will be described. The large cylindrical object 44 in the drawings is representative of vegetation to be pruned and, in this example, is meant to represent a section of a branch or a bush or the like. Assuming firstly that the arms 4, 6 are in the "open" position (FIG. 2) and the branch 44 is placed between the lower surface of the chain 8 adjacent the teeth 28 of arm 4, then the user will close the handles 14, 16 of the device until such time as the branch 44 contacts the lower surface of the chain 8 with its upper portion 44*a* and the teeth 28 of the arm 4 with its lower portion 44*b*. As the user squeezes the trigger 40, the chain 8 is caused to rotate and the barbs 26 formed thereon will cut into and through the branch 44 in known manner. Whilst this is occurring, the user continues to effect closing of the handles 14, 16 so as to effect a biasing force on the branch 44 into engagement with such cutting element. As the handles 14, 16 move closer together, the force applied thereto acting through the pivot point 12 causes the arms 4 and 6 also to move closer together. In this manner, therefore, the branch 44 is effectively squeezed between the lower arm 4 and the chain 8 and its chain bar 20 causing cutting of the branch 44. The position in FIG. 4, therefore, is that of the branch 44 having been out through about half of its diameter.

Because the handles 14, 16 are located in a plane generally perpendicular to the pivot axis passing through pivot point 12, the squeezing action of the user pushing handles 14, 16 towards each other minimises the extent to which substantial sidewards torque is applied to the pruning device as a result of this action. This in turn enables the user to maintain better control of the pruning device.

Continued force applied to the handles 14, 16 in order to bring them closer together results in the position shown in FIG. 5. Here it can be seen that the arm 4 has been brought into its completely closed position such that the side guard portions 4a and 4b of the guard portion 11 effectively shield the lower portion of the chain 8 from any contact by the user although the teeth 28 still engage in retaining the branch either side of such cutting element (as shown). It will be noticed, though, that the guard portion 10 of the upper arm 6 has been pivotally displaced from its position as shown in any of the other figures. In this particular embodiment, the guard portion 10 is pivotally connected to arm member 6 and biased towards an end stop position as shown in FIGS. 1 and 2 so as to closely abut and partially enclose the cutting element or chain 8. This functions as a chain guard mechanism. However, such a chain guard, if not pivotal, would limit the depth of branches that could be cut to the depth of the chain bar 20. However, by making such guard portion 10 pivotal, then as the branch 44 passes over the chain bar 20 during the cutting operation and as shown in FIG. 5, the upper portion 44a will eventually be forced in abutment with this guard portion 10 whereby the continued displacement of the branch past the cutting bar will effect pivotal displacement of the guard portion 10 as shown in FIG. 5 allowing the branch to continue to move past the chain 8 and the chain bar 20 in order to effect complete cutting thereof of any branch having a depth greater than that of the chain bar 20. Once the cut branches are then removed from the pruning device, the spring biasing of the guard portion 10 causes it to move back into position shown in FIG. 1 effectively providing its function as a chain guard. As mentioned, this chain guard is limited in its pivotal displacement so as not to be brought into engagement with the chain but to partially encompass it as shown in FIG. 1a. This provides for a variable cutting depth irrespective of the depth of the chain bar 20.

Having a movable guard portion 10 of the arm 6 is necessary in this example as the portions 6a, 6b of the guard portion 10 which sit on either side of the chain 8 in the direction perpendicular to the plane ABCD would otherwise simply abut the upper surface of the branch 44 and prevent further closing of the arm 4 toward the chain 8 and chain bar 20.

Figure 1C:
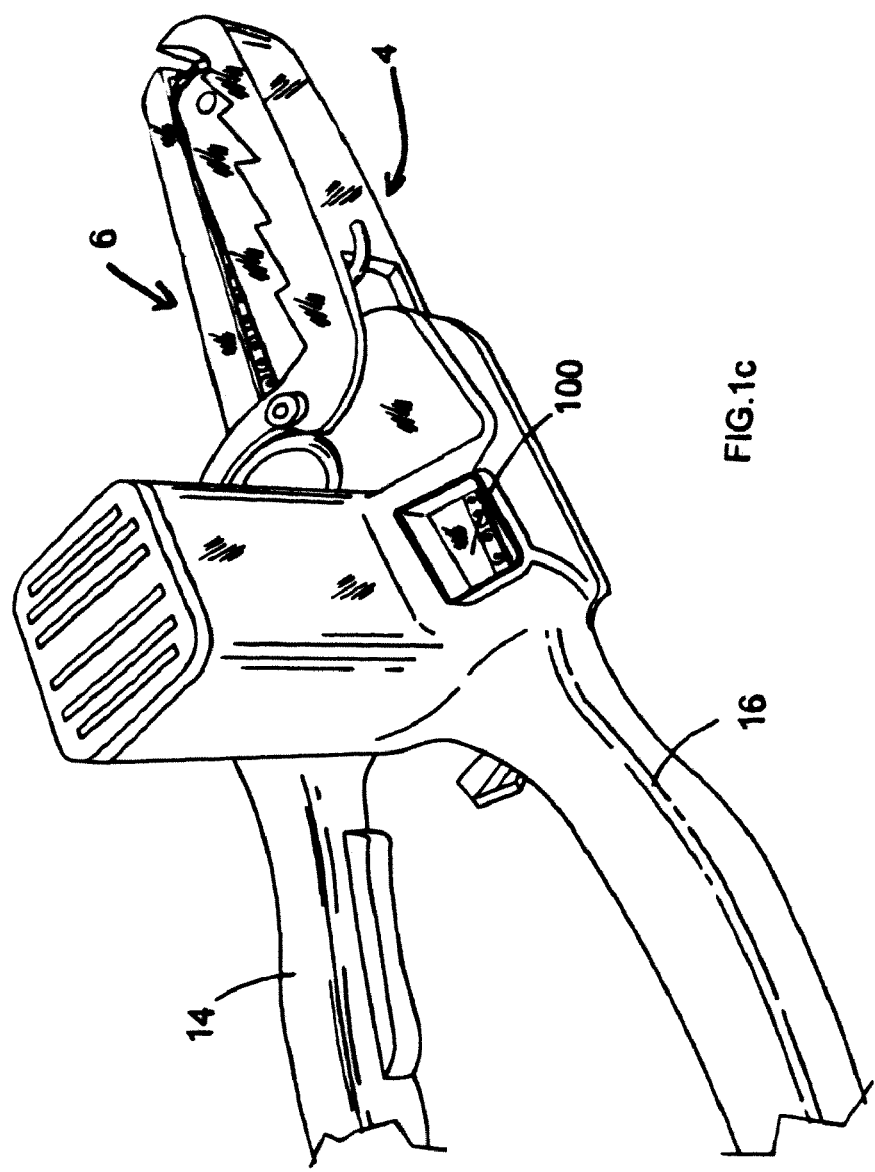
FIG. 1c is an opposed side view of the embodiment of FIG. 1.

Referring now to FIG 1c, showing the opposed side of the pruning device of FIG. 1, the device is provided with an appropriate dust or chip extraction aperture 100. As will be appreciated from FIGS. 4 and 5, the cutting operation of the chain 8 causes wood chippings and sawdust to be drawn towards the motor housing 17 and sprocket 30. Such movement is further enhanced by the formation of the U-shaped channel formed in guard portion 11 of arm member 4. As such, a lower portion of the motor housing 17 is provided with an appropriate internal channel and external aperture 100 so that any sawdust or wood chippings drawn into the motor housing are simply extracted so as to fall out of this aperture whereby the speed of rotation of the chain will create an appropriate airflow serving to drive the wood chippings out of the tool.

One of the major benefits of the current invention is the ability to provide a means of rigidly securing the branch or workpiece 44 in close proximity with the blade during the cutting operation. In this particular embodiment a further enhancement provides that the cutting element is partially encompassed so as to prevent inadvertent access thereto providing an enhanced safety feature for the operator. In a further variant (not shown) the invention can be further modified so that operation of the cutting element of the embodiment in FIGS. 1 to 5 is prevented in the absence of an article to be cut being placed between the cutting element 8 and the guard portion 11 of the arm 4. This could be achieved by providing an appropriate sensing mechanism registering the presence of a branch between such cutting element 8. An example would be the provision of a further limited pivot action of the lower arm 4 which would be biased to the position conventionally shown in FIGS. 1 to 5. The degree of pivotal displacement of this arm 4 about this additional pivot point would be limited to only a few degrees whereby when a branch is displaced between this arm 4 and the cutting element 8 and the arms closed, the resistance of the branch 44 would cause a slight pivotal displacement of the arm 4 against its associated biasing. Detection of this pivotal displacement would then be indicative of the presence of a branch to be cut and an appropriate facility employed within the device to allow operation of the motor on activation of the switches as previously described. Again, such feature could be mechanical or electrical. In the event of an electrical operation, one example would be that when the arm 4 is in its pivotally closed position as shown in FIGS. 1 to 3, then an appropriate electrical contact activates an appropriate switching element preventing operation of the motor. Once such electrical contact is broken (by the pivotal displacement effected by detection of a branch) operation of the motor can then be initiated. A further enhancement of this type of pivotal detection system will be that once the branch has been completely cut through and falls away from the tool such biasing force on the guard portion 11 of the arm 4 will be removed causing it to return to its normal position by the inherent resilient biasing causing closure of the aforementioned electrical contact and hence cessation of operation of the motor, stopping the tool. Thus, not only would this permit the tool to be operated only in the presence of a branch but that operation of the tool would automatically cease once that branch had been completely cut through.

Although in the example shown in FIGS. 1 to 5 the cutting element 8 and the guard portion 10 of the arm 6 together comprise one arm 6 of the pair of arms 4, 6, it will be appreciated that these may be formed as separate elements. For example, it could equally be the case that whilst one arm 4 of the pair of arms is a shown in the drawings, the other arm could actually comprise the chain bar 20 and its associated chain 8. In this example, therefore, the feature which is labelled 10 in the diagrams would not actually form part of the other arm of the pair but would be a pivoting spring biased portion formed as a separate element. This distinction is not germane to the present invention, however.

It will be understood by those skilled in the art that the sense of rotation of the chain 8 about its chain bar 20 determines the orientation of the teeth 28. Also this sense of rotation will determine between which arm 4 or 6 as shown in the drawings and the chain 8 the branch 44 to be cut is presented. Clearly it is not useful for the chain to rotate in the sense which causes the branch 44 to be pushed away from the pruning device but rather pulled in towards the pruning device 2 and, even then, to be engaged in as non-movable a manner as possible by the teeth 28.

Figure 8:
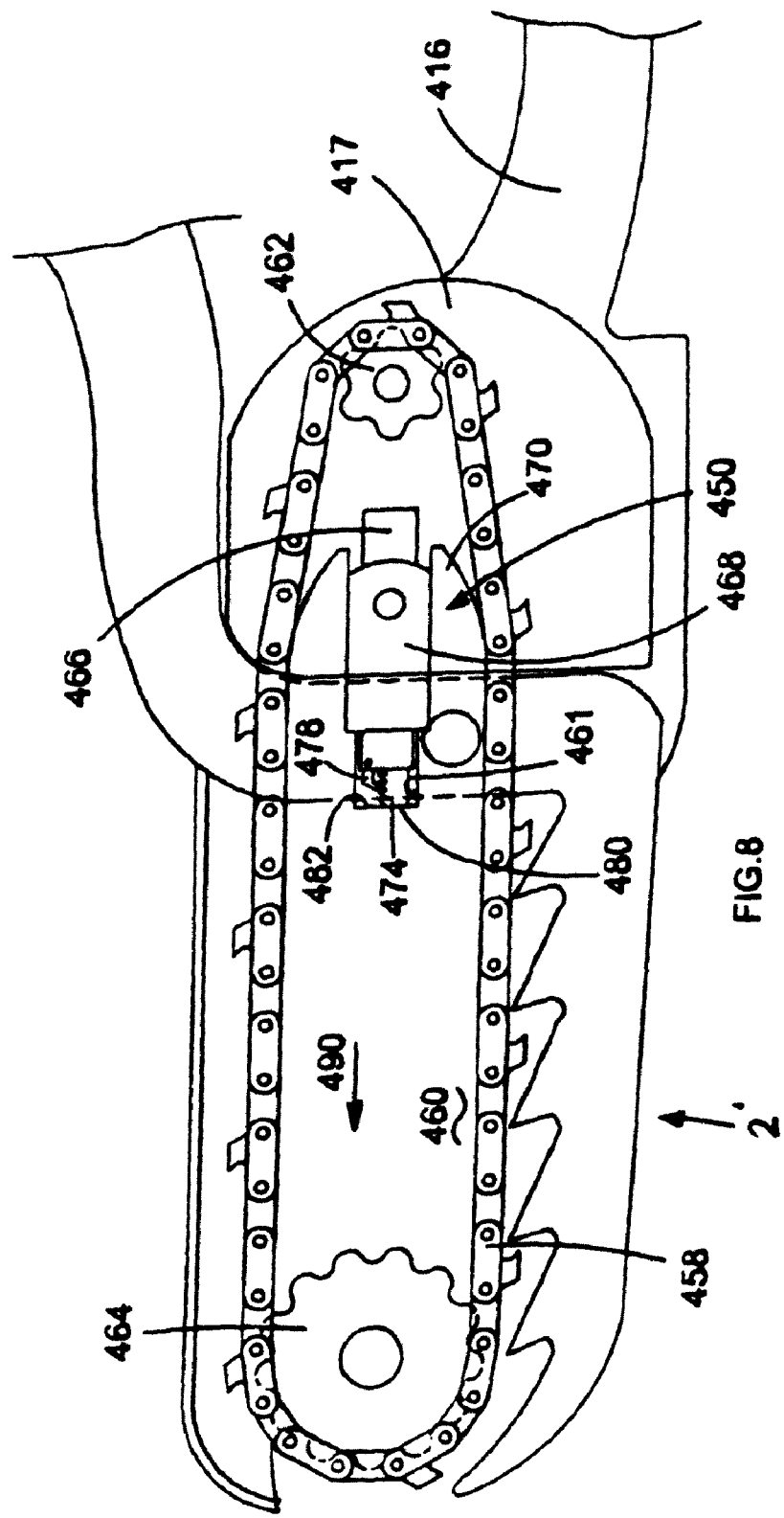
FIG. 8 is an enlarged cross sectional view of an alternative embodiment of the present invention illustrating an improved self adjusting blade tensioning device.
Figure 9:
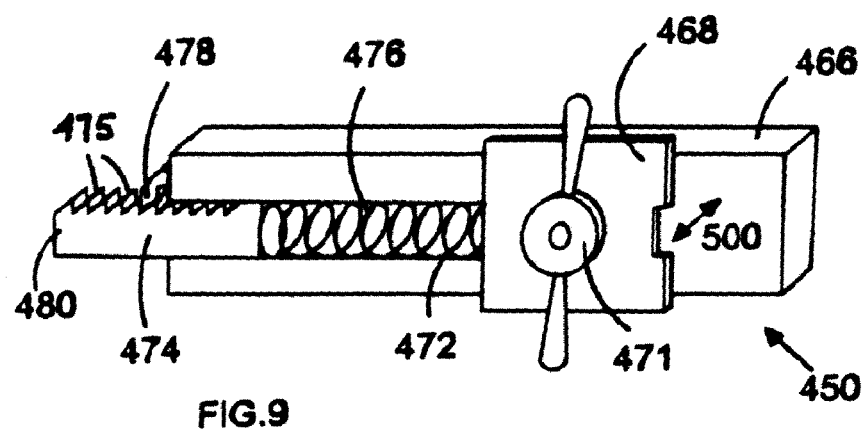
FIG. 9 is a perspective view from one side of the self adjusting blade tensioning device of FIG. 8.
Figure 10:
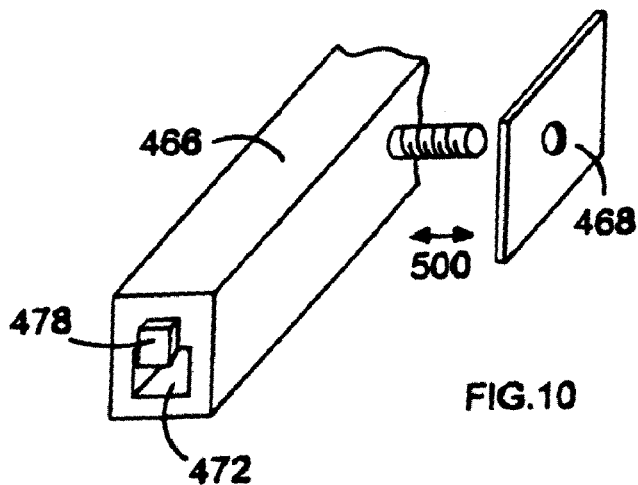
FIG. 10 is a front view of the self adjusting blade tensioning device of FIG. 9.
Figure 11:
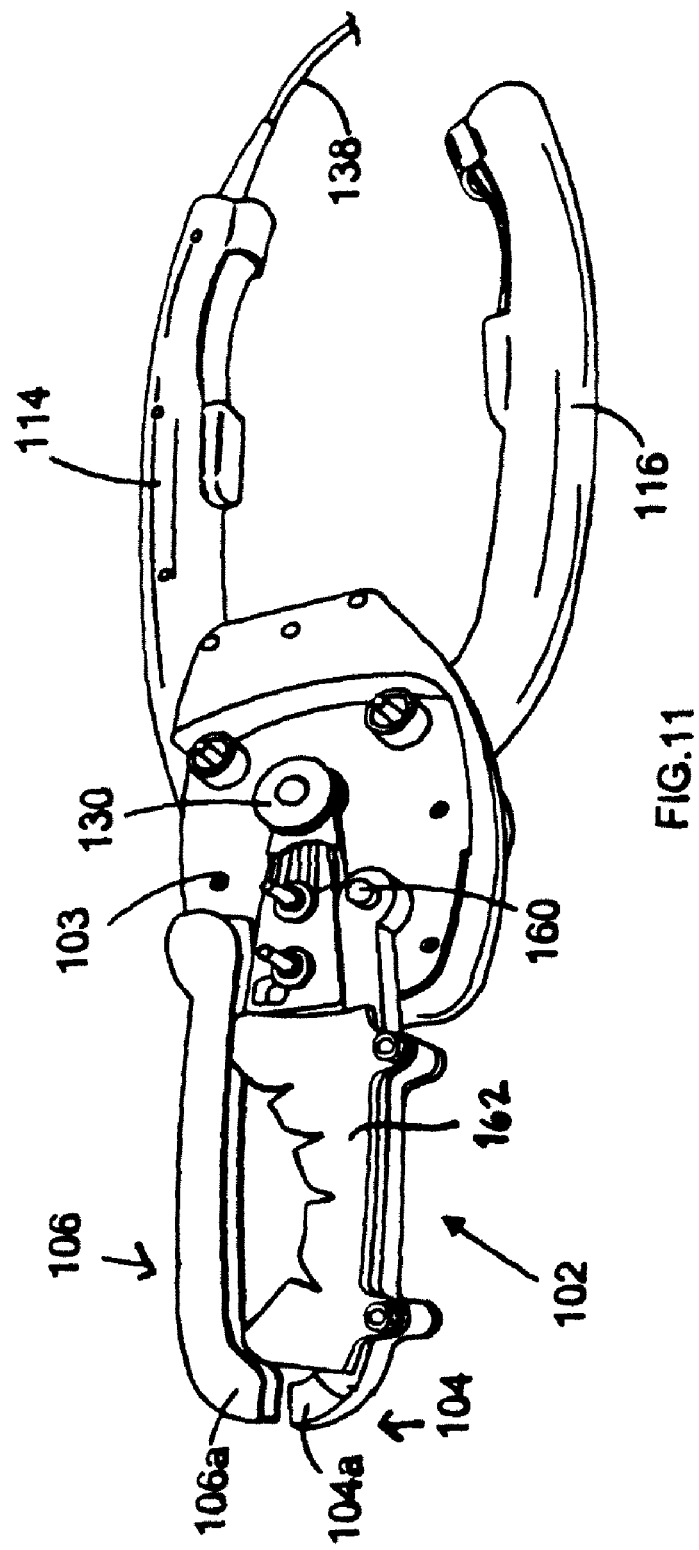
FIG. 11 is a perspective view of a further embodiment of the present invention with the jaws thereof in a substantially closed position and with the chain bar and cutting chain thereof removed.
Figure 12:
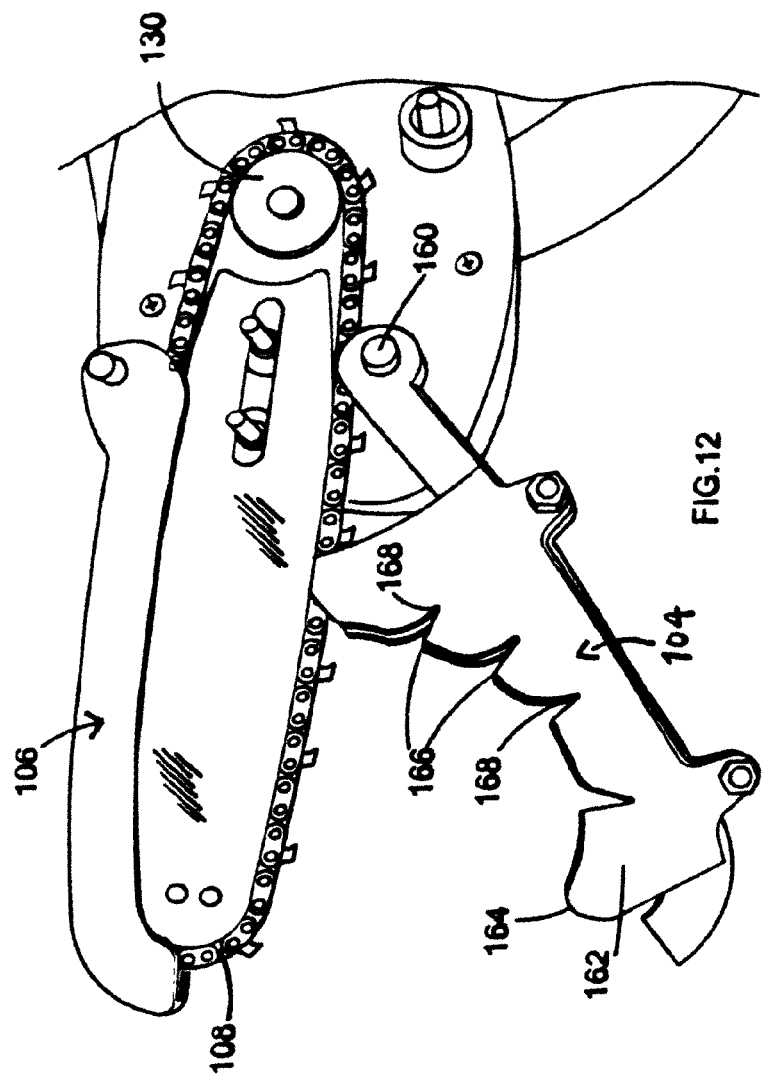
FIG. 12 is a detailed view of the jaws of the embodiment of FIG. 11 in an open condition with the chain bar and cutting chain present.
Figure 13:
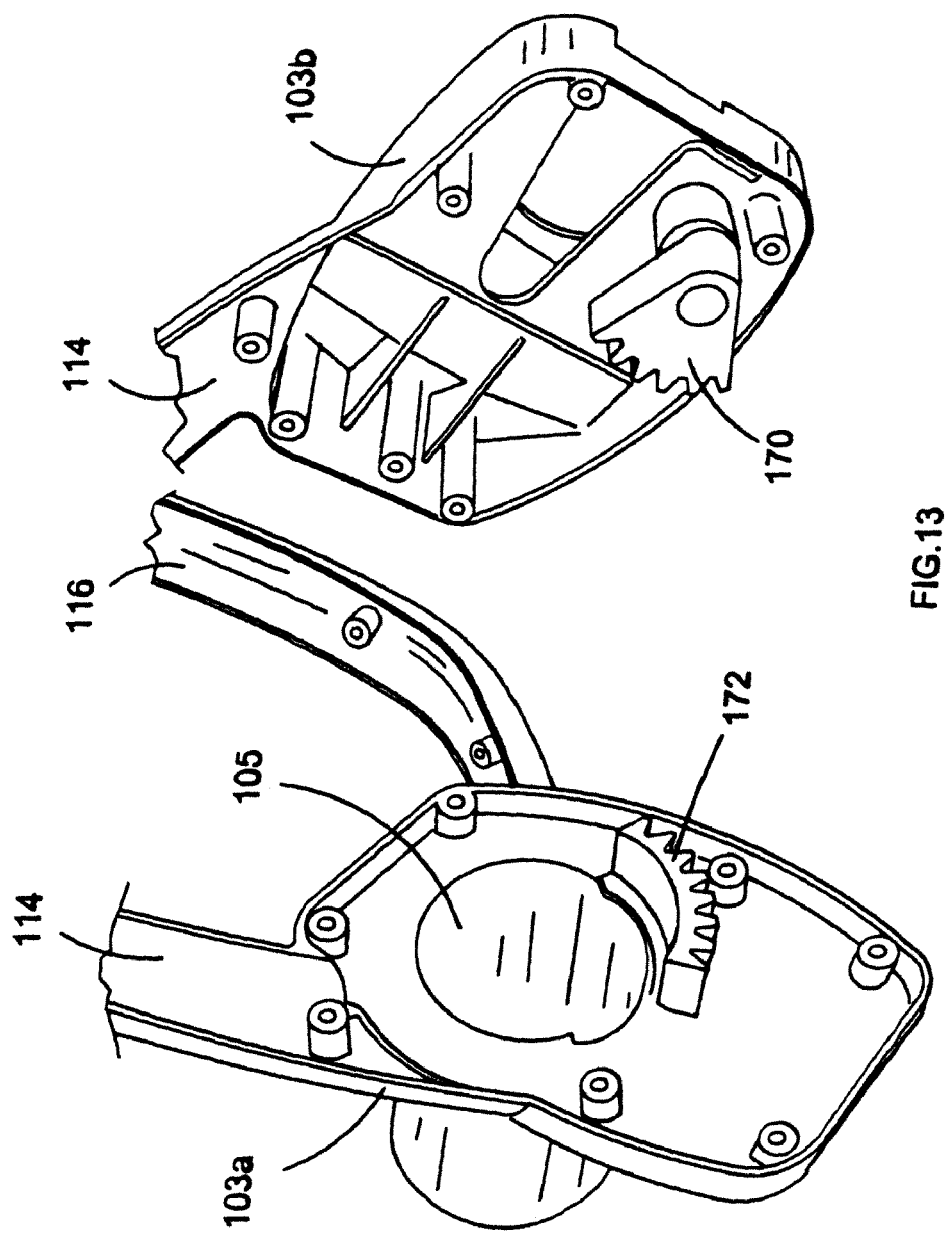
FIG. 13 is a perspective view of two cooperating parts of a housing of the embodiment of FIG. 11 in a disassembled condition.
Figure 14:
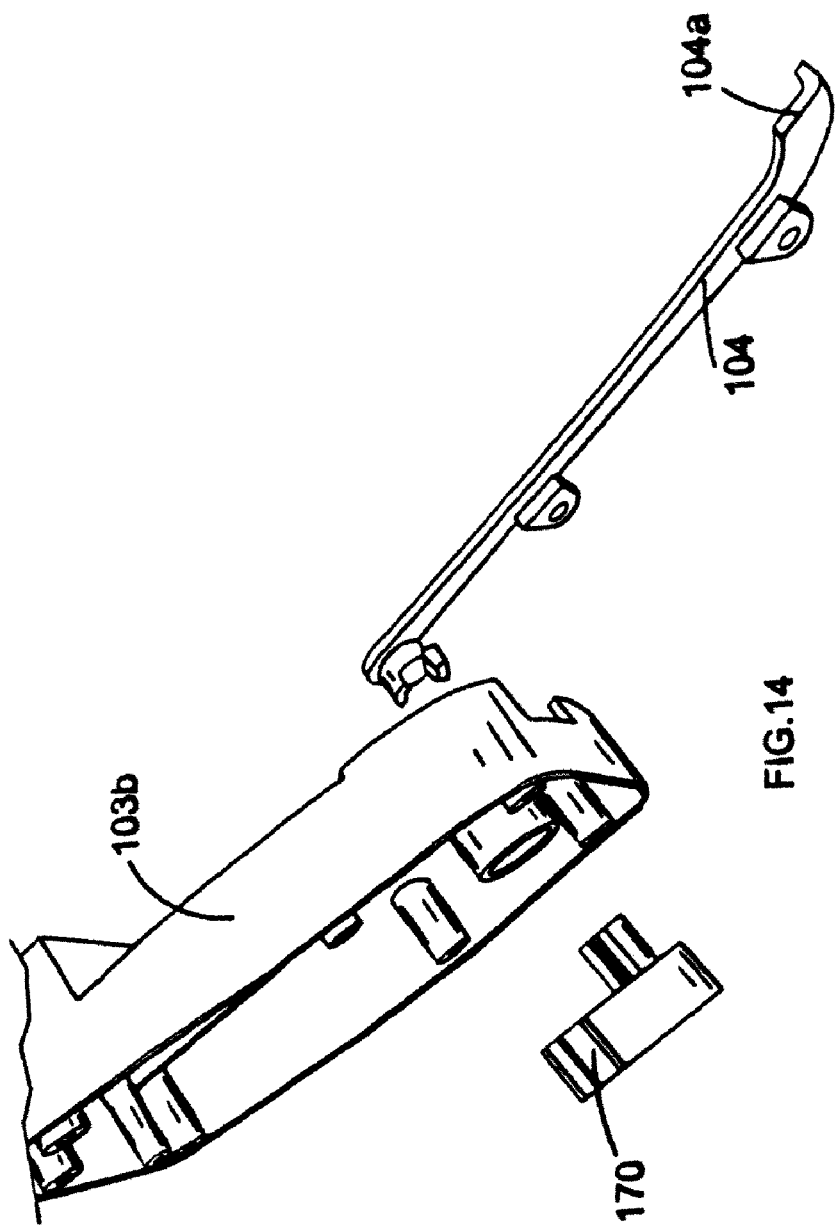
FIG. 14 is a perspective view of one part of the housing and gear mechanism shown in FIG. 13.

In a further enhancement of the present invention, now shown in FIGS. 8 through 10, there is provided a self-adjusting blade or chain tensioning device to replace the manually adjustable chain tensioning device shown with reference to FIG. 1a.

Referring now to FIG. 8 there is a shown an alternative pruning device 2' (identical to pruning device 2 of FIG. 1 with the exception of this chain tensioning device) having such a modified blade tensioning device shown generally by arrows 450. As discussed above, where the cutting element comprises a chain 458 mounted on an appropriate support member (or chain bar) 460 for such chain 458 to extend between a first drive wheel or sprocket member 462 and a driven wheel member 464 then use of the cutting chain 458 will incur considerable vibration, often effecting displacement of the support member 460 thus causing the chain to loosen. It is necessary that the support member 460 is adjustable so as to allow the chain to be retensioned as appropriate.

Referring now to FIG. 9 the self-adjusting device 450 is shown in more detail.

This device 450 comprises a primary mounting block 466 securely mounted to the motor housing 417 and hence handle portion 416 so as to be effectively integral therewith. Adjustably mounted on this mounting block 466 is a steel compression plate 468 which is adjustable relative to and away from the mounting member 466 (as indicated by arrow 500) so as to effectively compress or release an internal end portion 470 of the support member 460, as schematically illustrated in FIG. 8. Here it can be seen that the inner portion 470 of the support member 460 has a substantially rectangular recess 461 allowing it to pass over an appropriate screw threaded member (not shown) upon which the compression plate 468 is mounted whereby a conventional wing nut 471 or other rotatable member (eg. a rotatable knob) can then be used to adjust the compression plate towards or away from the mounting block 466 so as to compress and hold, or alternatively, release the support member 460 disposed between such plate 468 and block 466. Accordingly, this compression plate 468 is a greater size than recess 461 to allow positive engagement of the plate 468 with the support member 460. The device 450 is further provided with an internal elongate channel 472 slideably accommodating a plunger 474 which is spring loaded via an appropriate coil spring 476 disposed between an internal end of the channel 472 and the plunger 474 as shown. The channel 472 is substantially square in cross section so as to retain the plunger in a desired displaceable orientation relative to the support member 460 as will be described below. The plunger is further provided with a series of ratchet teeth 475 inclined in a direction away from the mounting block 466 as shown. An appropriate non-return ratchet pawl 478 is then rigidly connect to the mounting block 466 so as to engage with the ratchet teeth 475 to prevent a return of the plunger 474 back into the mounting block 466 once displaced there out of by the spring member 476. In practice, this non-return ratchet pawl will be provided with an appropriate adjustment means which allows it to be displaced out of engagement with the ratchet teeth when the self-adjusting device is to be released to allow removal of the chain and necessary reduction in tension thereof to allow such removal.

In practice, the support member 460 and the self-adjusting device 450 will be constructed as shown in FIG. 8 with an outer end surface 480 of the plunger 474 in abutment with an internal surface 482 of the recess 461 of the support member 460 as shown in FIG. 8. When the compression plate 468 is in a released position, disposed away from the block 466, the support member 460 is no longer frictionally restrained against the mounting block 466, whereby the inherent resilient biasing of the coil spring 476 (which is set at between 5 lbs and 10 lbs pressure in a normal embodiment but could be anywhere between 5 lb and 30 lbs of pressure) exerts a biasing force on the end surface 480 of the plunger 474 which is exerted against the internal surface 482 of recess 461 so as to effect adjustment of the support member away from the support blocking a direction as shown by arrow 490 in FIG. 8. The amount of displacement effected on the support member 460 by such biasing force is limited by the size of the chain member 458 but in this released configuration the self-adjusting device 450 serves to apply sufficient force to the support member 460 to effect appropriate tensioning to the chain 458 as required. The compression plate 468 can then be adjusted so as to clamp the support member 460 against the mounting block 466 to hold it in the self-adjusted, tensioned configuration. In practice the non-return ratchet pawl 478 will assist in maintaining the plunger in this appropriate position. In the event that there is subsequent loosening of the chain which requires the device to be re-tensioned, this is simply achieved by again releasing the compression plate 468 by adjustment of the appropriate rotatable release mechanism (wing-nut 471) whereby the biasing force of the coil spring 476 then effects sufficient displacement of the support member 460 to automatically retension the chain. This re-tensioned chain can then be clamped in position by retightening of the wing nut 471 and thus the compression plate 468 as previously described.

In the event that a user wishes to remove or replace the chain member 458 this is simply achieved by releasing the non-return ratchet pawl and applying sufficient force to the free-end of the support member 460 to overcome the biasing force of the spring 476 to effect sufficient displacement of the support member 460 towards the drive wheel 462 to allow the chain to be removed from such support member 460.

However, this specific embodiment provides an enhanced and simplified means of self-adjusting tensioning of a chain about a support member which simply allows loosening of the appropriate wing-nut on the compression plate 468 to effect appropriate self-adjustment of the chain tension.

Basically, this self adjusting blade tensioning device 450 effects relative displacement between the two support wheels 464 and 462 as shown. This is achieved by mounting the driven wheel 464 on the support member 460 and securing the tensioning device 450 so as to be immovably displaced relative to the drive wheel 462.

It is to be appreciated that this specific feature of self-adjusting blade tensioning device is not limited to use with a shear arrangement of the embodiments of FIGS. 1 to 7 but is equally applicable to any device utilising a rotatable chain where a minimum tensioning of the chain is required to be maintained and regularly adjusted, for example, conventional chainsaws or even bicycles. In addition, whilst the use of a wing nut is envisaged being mounted on a conventional screw threaded member to effect adjustment of the compression plate 468, alternative means of adjustment of this compression plate 468 to and away from the mounting block 466 is readily envisaged and could simply be a conventional nut mounted on a screw threaded member or even a hydraulic compression arrangement.

FIGS. 11 to 14 show a further embodiment of the present invention, in which parts common to the embodiment of FIGS. 1 to 7 are denoted by like reference numerals but increased by 100. The vegetation pruning device 102 has a main body 103, formed from a pair of mating clamshells 103*a*, 103*b*, from which a first handle 114 extends and is formed integrally. A second handle 116 is pivotable relative to the body 103, and the main body 103 supports drive sprocket 130 which is mounted to an output shaft of the motor (not shown) which is received in a cavity 105 (FIG. 13) in the body 103 such that the output shaft of the motor is arranged generally coaxially with the point at which the handles 114, 116 pivot relative to each other. This minimises the extent to which the motor, which is generally the heaviest component of the device 102, moves as the handles 114, 116 are moved relative to each other, making the device 102 easier to use.

A pair of arms 104, 106 are arranged such that their distal ends 104*a*, 106*a* touch each other when the handles 114, 116 are in the closed position, and the arm 104 is pivotably mounted to the body 103 about axis 160. The arm 104 carries a guard 162 (FIG. 12) having a pair of curved upper surfaces 164 provided with a series of teeth 166 defined by notches 168. As shown in greater detail in FIGS. 13 and 14, the arm 104 is integral with a first gear segment 170 located within the body 103 and which meshes with corresponding second gear segment 172 formed integrally with the handle 116 which is movable relative to the body 103. In this way, as the handles 114, 116 pivot relative to each other, movement of the first gear segment 170 causes movement of the second gear segment 172, as a result of which the guard 162 pivots relative to the cutting chain 108 (FIG. 12) to grip vegetation between the guard and the cutting chain. The teeth 166 on the guard 162 counteract the tendency of the cutting chain 108 to cause logs gripped between the guard 162 and the chain 108 to rotate, and the curved upper surfaces 164 of the guard 162 prevent logs from becoming jammed between the guard 162 and the chain 108.

The radii of the first and second gear segments 170, 172 are chosen such that the angle of movement between the guard 162 and the cutting chain 108 is larger than the angle of movement between the handles 114, 116. This achieves the advantage of reducing the gripping force between the guard 162 and the chain 108 for a given force applied between the handles 114, 116, which results in less electric current being drawn by the motor. This provides the advantage of enabling a motor of lower power (and therefore less weight) to be used, as well as reducing wear on the guard 162 and chain 108, and enabling a user to reach further by means of the tool, since the user's hands can be closer together. In addition, by causing the distal ends 104a, 106a of arms 104, 106 to meet when the handles 114, 116 are in the closed position relative to each other, this further enhances the safety of the device 102 by minimising the risk of inadvertent contact between power supply cable 138 and chain 108.

It will be appreciated by persons skilled in the art that the above embodiments have been described by way of example only and not in any limitative sense, and that various alterations and modifications are possible without departure from the scope of the invention as defined by the appended claims.

For example, the arms 4, 6 can be arranged to control access to chain 8 to enhance the safety of the apparatus, for example by biasing the arms 4, 6 towards their closed position by means of one or more springs, and/or by having an openable guard on one of the arms 4, 6 to allow access to the chain 8 to enable the chain 8 to be replaced when it becomes worn. An interlock arrangement can prevent the guard from being opened when the motor 36 is actuated and/or when the arms 4, 6 are in their open position relative to each other offering access to the cutting element 8, and can prevent the motor from being actuated when the guard is open. Also, it will be appreciated that the cutting element can be driven in a number of ways, for example by means of motor 36 having an output shaft arranged generally parallel to the axis of rotation of sprocket wheels driving the cutting element, or generally perpendicular to such axes, rotation of the output shaft of motor 36 driving one of the sprockets by means of one or more conical gears, or a gear plate rotated about an axis perpendicular to the axis of the output shaft and having gear teeth on its end face. One or more of the arms 4, 6 can also be arranged to have cutting edges on the face thereof facing away from the cutting element 8, so that the cutting edges can be used to effect manual cutting of vegetation by means of opening of the arms 4, 6 relative to each other.

The invention claimed is:

1. A vegetation pruning device comprising:
    a main body housing a motor and drive sprocket;
    a pair of handles for supporting the vegetation pruning device, said handles connected to the main body and pivotable relative to each other about a first axis to adjust the angle between said handles;
    said motor having a rotary output drive rotatable about a second axis;
    an endless flexible cutting element mounted to a support on said main body and driven relative to said support by said rotary output drive to cut vegetation presented thereto;
    a first guard member pivotably mounted on said main body and moved relative to said cutting element by pivoting said handles relative to each other to grip vegetation between said first guard member and said cutting element;
    wherein said motor and rotary output drive are arranged adjacent said first axis; and
    wherein a gear assembly is located in the main body and connects the handles to said first guard member, whereby pivoting of the handles pivots the first guard member relative to said main body about said first axis.

2. The vegetation pruning device according to claim 1, wherein said first axis is substantially parallel to said second axis.

3. The vegetation pruning device according to claim 1, wherein the gear assembly is configured such that the angle of movement of the first guard member relative to said cutting element is greater than the angle of movement of the handles.

* * * * *